United States Patent [19]

Mizusawa

[11] 4,279,447
[45] Jul. 21, 1981

[54] BRAKE OIL PRESSURE CONTROLLING VALVE DEVICE FOR VEHICLE USE

[75] Inventor: Mitsutoyo Mizusawa, Ueda, Japan

[73] Assignee: Nissin Kogyo Kabushiki Kaisha, Ueda, Japan

[21] Appl. No.: 77,491

[22] Filed: Sep. 20, 1979

[30] Foreign Application Priority Data

Nov. 9, 1978 [JP] Japan ................................ 53-138197

[51] Int. Cl.³ .............................................. B60T 8/14
[52] U.S. Cl. ................................. 303/6 C; 303/24 A; 303/24 F
[58] Field of Search .................. 303/24 F, 6 C, 24 C, 303/24 A; 188/349

[56] References Cited

U.S. PATENT DOCUMENTS

| 3,888,546 | 6/1975 | Stordahl, Jr. ................. 303/24 C X |
| 4,072,363 | 2/1978 | Tomoyuki ........................ 303/24 C |
| 4,181,370 | 1/1980 | Noeami et al. ............... 303/24 C X |
| 4,199,197 | 4/1980 | Maehara ............................ 303/24 F |

FOREIGN PATENT DOCUMENTS 2003240 3/1979 United Kingdom ................... 303/24 F Primary Examiner—Douglas C. Butler
Attorney, Agent, or Firm—Haseltine and Lake

[57] ABSTRACT

Arranged in parallel with a main control valve, which is principally of the conventional structure including a spherical weighted valve element operable under inertial force, is an auxiliary control valve, that includes a differential piston type valve element normally held in valve-opening position under a spring bias and is operable in response to the oil pressure in the rear wheel brakes rising above a predetermined level to close or to reduce the oil pressure being transmitted therefrom to the rear wheel brakes. With continued rise of the output oil pressure of the brake master cylinder, the valve element is moved away from and close to the valve seat in a repeated fashion. With the dual arrangement of main and auxiliary control valves, there is no impairment of the brake performance such as encountered previously with the conventional valve device, in spite of any premature closing of the main control valve as may occur in brake application during vehicle travel down a steep slope or in sudden brake application.

2 Claims, 3 Drawing Figures

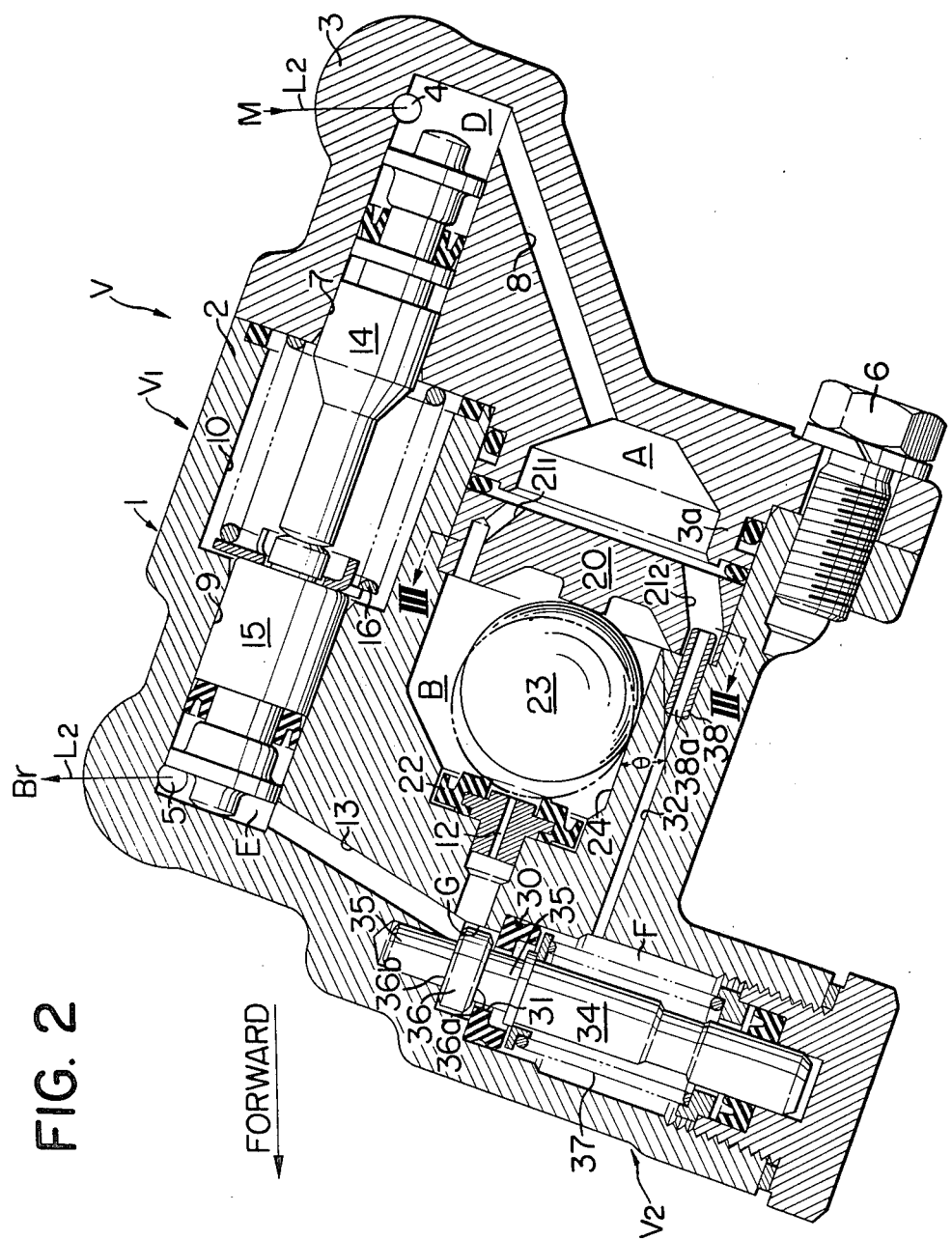

BRAKE OIL PRESSURE CONTROLLING VALVE DEVICE FOR VEHICLE USE

BACKGROUND OF THE INVENTION

1. Field of the Invention

This invention relates to brake oil pressure controlling valve devices for use on automotive vehicles or the like.

2. Description of Prior Art

As is known, a valve device of the kind concerned is arranged in an automotive brake system in order to obtain a satisfactory braking effect by restraining oil pressure rise in the rear wheel brakes as occurring when the brake pedal is depressed and the inertial mass of the vehicle body shifted forwardly, reducing the effective loads on the rear wheels, thereby to prevent the wheels from being locked. The known form of such valve device includes a control valve inserted in the brake oil line interconnecting the brake master cylinder and the rear wheel brakes and operable in response to the vehicle deceleration exceeding a predetermined value to reduce the level of oil pressure being transmitted to the rear wheel brakes to a level substantially below that of the oil pressure output from the brake master cylinder.

For such operation responsive to vehicle deceleration, the brake oil pressure controlling valve device generally includes a weighted valve element arranged in a valve chamber inserted in the brake oil line intermediate the ends thereof and movable to close the valve port in response to the vehicle deceleration exceeding a predetermined value. This arrangement, however, has previously involved some problems. First, when the vehicle runs down a steep slope, the weighted valve element is apt to misoperate and impair the braking performance, hindering any proper rise of oil pressure in the rear wheel brakes. Secondly, the time of action of the valve element is variable with the speed of brake application due to the dynamic effect upon the valve element of the pressure oil from the brake master cylinder flowing into the valve chamber. This causes the upper limit valve of the oil pressure being transmitted to the rear wheel brakes to change and thus makes it difficult to obtain the brake performance desired.

SUMMARY OF THE INVENTION

Under these circumstances, the present invention has for its object the provision of a new and improved brake oil pressure controlling valve device of the kind concerned which is adapted to overcome any such problems as described above.

According to the present invention, there is provided a brake oil pressure controlling valve device for vehicle use which comprises a main control valve inserted in the brake master cylinder and the rear wheel brakes and designed to act in response to the vehicle deceleration exceeding a predetermined value to reduce the level of oil pressure being transmitted to the rear wheel brakes and an auxiliary control valve inserted in the brake oil line in parallel to the main control valve and designed to close or to reduce the level of oil pressure being transmitted to the rear wheel brakes in response to the vehicle deceleration exceeding a predetermined value.

The above and other objects, features and advantages of the present invention will become apparent from the following description when taken in conjunction with the accompanying drawing.

BRIEF DESCRIPTION OF THE DRAWING

In the drawing:

FIG. 2 represents a side-elevational vertical cross section of a preferred form of controlling valve device embodying the present invention.

DESCRIPTION OF THE PREFERRED EMBODIMENTS

Figure 1:
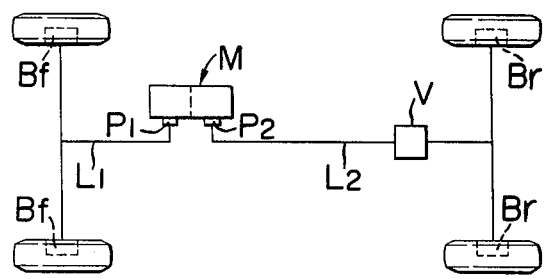
FIG. 1 represents the oil circuit diagram of an automotive brake system incorporating a brake oil pressure controlling valve device of the present invention.

Referring to the drawing and first to FIG. 1, reference character M indicates a tandem type brake master cylinder arranged to be actuated by a brake pedal, not shown, and having a first and a second output port $P_1$ and $P_2$. The first output port $P_1$ is connected through a first oil line $L_1$ to the wheel cylinders of the respective front wheel brakes Bf and the second output port $P_2$ is connected through a second oil line $L_2$ to the wheel cylinders of the respective rear wheel brakes Br. Inserted in the second oil line $L_2$ is a brake oil pressure controlling valve device V of the present invention.

Figure 3:
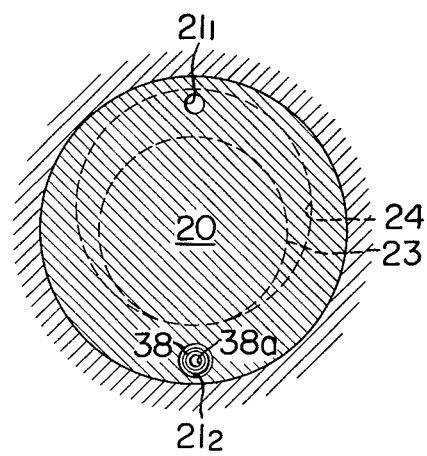
FIG. 3 is a cross section taken along the line III—III in FIG. 2.

The valve device V is illustrated in FIGS. 2 and 3 in one preferred form and will next be described in detail.

Reference numeral 1 generally indicates a valve casing of split form including a casing body or front section 2 and a rear, cover section 3 which are fastened together into an integral casing structure by bolt means 6. The cover section 3 has formed on one side thereof an input port 4, which is connected with the upstream section of second oil line $L_2$, while the casing section 2 has formed on one side thereof an output port 5, which is connected with the downstream section of second oil line $L_2$.

The cover section 3 also has a smaller diameter cylinder bore 7 formed in fluid communication with the input port 4, a tubular portion 3a protruding forwardly from the front face of cover section 3 and defining therein an attenuating or damping chamber A, and an inflow passage 8 extending between the rear end portion of the smaller-diameter cylinder bore 7 and the damping chamber A. On the other hand, the casing body section 2 is formed therein with a larger-diameter cylinder bore 9 axially aligned with the smaller-diameter cylinder bore 7 in the cover section 3 and communicating with the output port 5, a spring chamber 10 extending between the larger-diameter and smaller-diameter cylinder bores 9 and 7, a cylindrical-shaped valve chamber B with its axis extending in the direction of vehicle travel or length of the vehicle, a valve port 12 opening to the valve chamber B at the front end of the latter, and an outflow passage 13 extending between the valve port 12 and the front end portion of the larger-diameter cylinder bore 9.

A smaller-diameter piston 14 is slidably fitted in the smaller-diameter cylinder bore 7 in the cover section 3 to define a main input oil pressure chamber or space D in the cylinder bore 7 at the rear end thereof, which is in communication, as shown, with the inlet port 4 and the inflow passage 8. Similarly, a larger-diameter piston 15 is slidably fitted in the larger-diameter cylinder bore 9 in the casing body 2 to define a main output oil pressure chamber or space E in the cylinder bore 9 at the front end thereof.

The two pistons 14 and 15 are aligned with each other and normally held, as shown, in abutting engagement with each other at their adjoining ends lying in the spring chamber 10. A coiled spring 16 is arranged under compression in the spring chamber 10 to bias the larger-diameter piston 15 forwardly into the main output oil pressure chamber E. The larger-diameter piston 15 is thus normally held in its foremost position under a definite biasing force of spring 16.

Though in this embodiment the two aligned pistons 14 and 15 are made separate from each other for reasons of machining accuracy, it is to be understood that they may alternatively be formed integral with each other without any loss in performance.

Further, the casing body section 2 is formed to fittingly receive the tubular portion 3a of cover section 3 and a partition plate 20 of disc form lying in front of the tubular portion 3a. A first and a second communication hole $21_1$ and $21_2$ are formed through the top and bottom portions, respectively, of the partition plate 20. The first communication hole $21_1$ interconnects the damping chamber A and valve chamber B. Arranged about the valve port 12 opening to the valve chamber B is a valve seat 22 of elastic material. Accommodated in the valve chamber B is a spherical-shaped, weighted valve element 23 which cooperates with the valve seat 22 to open and close the valve port 12, as will be described below in detail.

The valve chamber B has a sloped bottom surface 24 which is inclined upwardly forwardly of the vehicle at a definite angle $\theta$ to the horizontal depending upon the mounting angle of the valve casing 1 on the vehicle body. Accordingly, the weighted valve element 23 normally remains on the sloped bottom 24 in its lowest, rearmost position, bearing against the partition plate 20 to leave the valve port 12 open.

The arrangement of the components described above forms a main control valve $V_1$, which is conventional in structure except for the second communication hole $21_2$ formed in the partition plate 20. In operation, it will be readily understood that, when during vehicle travel the brake pedal is depressed to activate the brake master cylinder M, the oil pressure output from the first output port $P_1$ of the latter is fed through the first oil line $L_1$ to the front wheel brakes Bf to actuate the latter. On the other hand, the oil pressure output from the second output port $P_2$ of brake master cylinder M is directed through the upstream section of second oil line $L_2$ and through the inlet port 4 into the valve casing 1. The pressure oil entering the valve casing 1 flows through the inflow passage 8 into the damping chamber A to be retarded therein and further proceeds through the first communication hole $21_1$ into the valve chamber B. The pressure oil is thence directed through the valve port 12, outflow passage 13, output port 5 and the downstream section of second oil line $L_2$ to the rear wheel brakes Br to actuate the latter. Subsequently, when the deceleration of the vehicle under brake reaches a predetermined level, the weighted valve element 23, responding to such deceleration, rises forwardly along the sloped surface 24 under the force of inertia of its own, as indicated by the chain-dotted line in FIG. 2, and is seated on the valve seat 22 to close the valve port 12. Consequently, the rise of working oil pressure in the rear wheel brakes Br is restrained, the maximum value thus allowed of the working oil pressure being variable with the amount of load weight on the vehicle.

Further, in the usual brake application, the smaller-diameter and larger-diameter pistons 14 and 15 are caused to slide rearwardly before the forward movement of the weighted valve element 23 as the preset compressive load on the coiled spring 16 is overcome by the force of oil pressure acting rearwardly (or to the right as viewed in FIG. 2) upon the two pistons 14 and 15 as a unit because of the difference between the pressure-bearing area of smaller-diameter piston 14 exposed to the main input oil pressure chamber D and that of larger-diameter piston 15 exposed to the main output oil pressure chamber E.

After the rise of working oil pressure in the rear wheel brakes Br has been restrained under the action of the weighted valve element 23, when the force of brake pedal depression is increased to raise the output oil pressure of the brake master cylinder M and hence the oil pressure in the main input oil pressure chamber D, the two pistons 14 and 15 are forced to slide forwardly back to their normal position illustrated. In this manner, the oil pressure in main output oil pressure chamber E and that in the rear wheel brakes Br are increased again till the larger-diameter piston 15 comes into abutting engagement with the adjacent end wall of the larger-diameter cylinder bore 9. Accordingly, after the deceleration of the vehicle has once reached a predetermined level, it will be noted that the output oil pressure of the brake master cylinder M is transmitted to the rear wheel brakes Br only at a level reduced proportionally to the vehicle deceleration so that any danger of the rear wheels being locked is effectively avoided notwithstanding the reduction in load on the rear wheels occurring upon brake application.

On the other hand, when the vehicle is inclined forwardly downward as when it travels down a steep slope, the valve casing 1, normally held in a forwardly upwardly inclined position, is tilted forwardly to approach a horizontal position so that the angle of inclination, $\theta$, of the bottom surface 24 of valve chamber B is reduced almost to zero. In this state, when the vehicle is braked, the weighted valve element 23 responds even to any slight deceleration of the vehicle to close the valve port 12 without allowing the pistons 14 and 15 to be advanced beforehand toward the input port 4 under the oil pressure in the main output oil pressure chamber E in the manner described hereinbefore. As will readily be noted, once the valve port 12 has been closed, any rise of the output oil pressure from the brake master cylinder M only results in a corresponding rise in working oil pressure in the front wheel brakes Bf and no rise in working oil pressure in the rear wheel brakes Br is obtainable, giving rise to a shortage of braking force at the rear wheel brakes Br.

It is to be noted that such trouble possibly occurs also when the vehicle is suddenly braked. Specifically, when the brake pedal is depressed suddenly so as to cause a rapid flow of pressure oil from the damping chamber A through communication hole $21_1$ into the valve chamber B, the weighted valve element 23 may be moved forward under the dynamic effect of the oil flow to close the valve port 12 prematurely before the vehicle deceleration reaches the predetermined level.

In order to avoid such trouble, the second oil line $L_2$ is provided with an auxiliary control valve $V_2$, which is arranged in the oil line $L_2$ in parallel to the main control valve $V_1$ and of which the construction and arrangement will next be described.

Referring again to FIG. 2, the body section 2 of valve casing 1 is further formed therein with an auxiliary input oil pressure chamber F and an auxiliary output oil pressure chamber G aligned therewith, with a valve seat member 30 of rubber or the like elastic material interposed between the two chambers F and G. The auxiliary input oil pressure chamber F is in fluid communication with the damping chamber A and hence the main input oil pressure chamber D by way of a duct passage 32 formed in the wall of casing body 2 and the second communication hole $21_2$ in the partition plate 20. The auxiliary output oil pressure chamber G is in fluid communication with the outflow passage 13 and hence with the main output oil pressure chamber or space E.

As illustrated, there is provided between the auxiliary input and output oil pressure chambers F and G a piston type valve element 34 which serves an auxiliary controlling function of placing the two chambers F and G in and out of fluid communication with each other in cooperation with the valve seat member 30. The valve element 34 is comprised of a valve stem portion 35 and a pressure-bearing piston portion 36. The valve stem 35 extends through a valve port 31 formed in the valve seat member 30 and is slidably supported at the opposite ends in the adjacent wall portions of valve casing 1. The pressure-bearing piston portion 36 of valve element 34 is arranged in the auxiliary output oil chamber G in opposed relation to the valve seat 30. The valve stem 35 has different diameters on the opposite sides of the pressure-bearing piston portion 36; that is, the diameter of the valve stem portion adjoining the pressure-bearing piston 36 on its side remotes from the auxiliary input oil pressure chamber F is larger than that of the valve stem portion adjoining the other side of piston 36. In other words, one of the pressure-bearing surfaces, 36a, of piston 36, which confronts the valve seat 30, is smaller in area than the other pressure-bearing surface 36b of the piston 36. A coiled spring 37 is arranged under compression in the auxiliary input oil pressure chamber F to bias the valve element 34 in a direction toward the auxiliary output oil pressure chamber G. In this manner, the valve element 34 is normally held under a definite spring bias in the position shown with the pressure-bearing piston 36 held apart from the valve seat 30 to open the valve port 31.

Securely fitted in the second communication hole $21_2$ formed in the partition plate 20 and the duct passage 32 in the valve casing body 2 at the juncture therebetween is a tubular positioning pin 38 which serves to hold the partition plate 20, of disc form, against any inadvertent rotation relative to the casing body 2 while placing the second communication hole $21_2$ and duct passage 32 in fluid communication with each other through the hollow interior 38a of positioning pin 38.

In operation of the brake master cylinder M, the pressure oil emerging from the second output port $P_2$ and entering the valve casing 1 through the input port 4 is appropriately slowed down upon reaching the damping chamber A and proceeds therefrom into both the first and second communication holes $21_1$ and $21_2$. The flow of pressure oil through the first communication hole $21_1$ serves the function described hereinbefore in connection with the main control valve $V_1$, entering the valve chamber B thereof.

Pressure oil proceeding through the second communication hole $21_2$ is directed through the hollow interior 38a of positioning pin 38 and duct passage 32 into the auxiliary input oil pressure chamber F and is thence fed through valve port 31, auxiliary output oil pressure chamber G and output port 5 to the rear wheel brakes Br to actuate the latter.

Upon further rise of the pressure output of brake master cylinder M, when the oil pressure in the auxiliary output oil pressure chamber G reaches a predetermined level, the differential oil pressure force acting downwardly, as viewed in FIG. 2, upon the pressure-bearing piston 36 due to the difference in area between the opposite pressure-bearing surfaces 36a and 36b of the latter overcomes the load setting of spring 37, thus causing the valve element 34 to descend until the pressure-bearing piston 36 comes into engagement with the valve seat 30 to close the valve port 31 thereby to disconnect the two auxiliary oil pressure chambers F and G from each other.

Subsequently, as the output oil pressure from the brake master cylinder M is raised further, the oil pressure in the auxiliary input oil pressure chamber F, acting on the pressure-bearing surface 36a of piston 36, is raised accordingly so that the valve element 34 is pushed up again to open the valve port 31. As the result, the oil pressure in the auxiliary output oil pressure chamber G rises to increase the downwardly acting differential pressure acting on the pressure-bearing piston 36 so that the valve element 34 is forced down again to close the valve port 31 and such valve operation is repeated as the output oil pressure of the brake master cylinder M further continues to rise. It will be appreciated, therefore, that, once the valve element has been started to act, the oil pressure in the auxiliary input oil pressure chamber F is transmitted to the auxiliary output oil pressure chamber G at a level proportionally reduced under control of the valve element 34.

Because of such operation of the valve element 34, it will be understood that, even if the weighted valve element 23 of main control valve V should be prematurely actuated to close the valve port 12 for some reason or other, the oil pressure from the brake master cylinder M can be transmitted to the rear wheel brakes Br by way of the valve port 31 of the auxiliary control valve $V_2$. In that event, it will be apparent that the level of working oil pressure in the rear wheel brakes Br depends upon the operating characteristic of the valve element 34.

Futher, with this valve device, it will be noted that, since in the initial period of braking operation the pressure oil flow from the brake master cylinder M is divided to enter both the valve chamber B and auxiliary input oil pressure chamber F, the rate of flow of oil passing through the valve chamber B is materially reduced compared with that in the conventional form of valve device and the dynamic pressure of such oil flow acting on the weighted valve element 23 only exerts a substantially reduced effect thereon. This enables the weighted valve element 23, even in a quick brake application, to accurately respond to the vehicle deceleration exceeding a predetermined value without being disturbed by any substantial dynamic fluid pressure otherwise acting on the valve element Further, since the partition plate 20 is securely held against any inadvertent rotation by means of positioning pin 38 with the first communication hole $21_1$ held at all times in its set position, the effect of dynamic fluid pressure upon the weighted valve element 23 remains unchanged for any particular rate of flow of pressure oil as entering the valve chamber B, thus making the valve performance characteristic particularly stable.

Incidentally, the oil flow through the valve chamber B can conveniently be adjusted by throttling the first communication hole $21_1$ or valve port 12 by appropriate means.

Description will next be made of the valve operation when the brake pedal is released. Even with the valve element 34 held to close the valve port 31 under the downwardly directed differential oil pressure force, the pressure oil previously fed to the rear wheel brakes Br is allowed to flow back to the brake master cylinder M through the output port 5, valve port 12 (which the weighted valve element 23 leaves open upon brake release), valve chamber B, first communication hole $21_1$, damping chamber A and inlet port 4. Accordingly, the oil pressure in the auxiliary output oil pressure chamber G is reduced to cause the downward differential oil pressure acting upon the valve element 34 to be reduced or disappear, allowing the valve element 34 under the action of coiled spring 37 to restore its normal position to open the valve port 31. There is therefore, no need for providing any particular means on the valve element 34 for recirculation of pressure oil.

Further, in the present invention, the auxiliary control valve including valve element 34 may take the form of a so-called oil pressure limiting valve that is closable upon rise of the oil pressure in the auxiliary output oil pressure chamber G above a definite level. In this case, it will be understood that upon brake application the pistons 14 and 15 are retracted against the set load of coiled spring 16 under the effect of the output oil pressure of the oil pressure limiting valve before the latter is closed. It will be noted, therefore, that, after the closing of both valve ports 12 and 31, the output oil pressure of brake master cylinder M is transmitted to the rear wheel brakes Br without any trouble at a level reduced proportionally with the advancing movement of the pistons 14 and 15.

Further, though, in the embodiment shown and described herein, the main and auxiliary control valves V1 and V2 are formed in a common valve casing 1, it will be understood that they may alternatively be constructed with respective independent valve casings. It is to be noted, however, that use of a single valve casing 1 common for the two control valves V1 and V2 as in the embodiment illustrated is preferable for simplification of the structure of the valve device as a whole and for reduction in cost.

To summarize, according to the present invention, there are inserted in the brake oil line between the brake master cylinder and the rear wheel brakes a main control valve designed to act in response to the vehicle deceleration of a predetermined value or above to reduce the level of oil pressure being transmitted to the rear wheel brakes and an auxiliary control valve arranged in parallel to the main control valve and designed to act in responce to the rise of working oil pressure in the wheel brakes to a predetermined level or over to close or to reduce the level of oil pressure being transmitted to the wheel brakes. Upon brake application, even if the main control valve be actuated for some reason or other prematurely before the working oil pressure in the wheel brakes is raised to an appropriate level, the output oil pressure of the brake master cylinder is transmitted to the wheel brakes through the auxiliary control valve, still remaining in its normal open position, to compensate for the shortage of the braking force at the rear wheels, thus enabling the brake system to work properly without any trouble. Further, in normal braking operation, the pressure oil flow from the brake master cylinder is divided into two separate streams which are directed respectively through the main and auxiliary control valves and the influence of the dynamic fluid pressure on the valve element in the main control valve is substantially limited so that the main control valve can respond accurately to a definite level of vehicle deceleration to start restraining the rise of working oil pressure in the wheel brakes at an instant variable in accordance with the load weight carried on the vehicle for efficient braking operation.

What is claimed is:

1. A brake oil pressure controlling valve device for vehicle use, comprising a valve casing formed therein with an input port communicating with the brake master cylinder and an output port communicating with the rear wheel brakes, a partition plate fitted in said valve casing to define in the interior thereof a damping chamber communicating with said input port and a valve chamber communicating with said output port by way of a valve port, said partition plate being formed therein with a first communication hole to place the damping and valve chambers in fluid communication with each other, a weighted valve element arranged in said valve casing and movable to close said valve port in response to the vehicle deceleration exceeding a predetermined value, a pair of smaller-diameter and larger-diameter cylinder bores formed in a side wall portion of said valve casing in substantially axially aligned relation to each other, a pair of smaller-diameter and larger-diameter pistons endwise held against each other and slidably fitted respectively in said smaller-diameter and larger-diameter cylinder bores to define in said smaller-diameter cylinder bore a main input oil pressure chamber communicating with said input port and in said larger-diameter cylinder bore a main output oil pressure chamber communicating with said output port, spring means arranged on said larger-diameter piston to bias the latter axially in the direction of said main output oil pressure chamber under a definite spring bias, an auxiliary input oil pressure chamber formed in said valve casing and communicating with said damping chamber by way of a second communication hole formed in said partition plate and a duct passage formed in the adjacent wall of said valve casing, an auxiliary output oil pressure chamber formed in said valve casing in fluid communication with said main output oil pressure chamber, an auxiliary control valve arranged between said auxiliary input and output oil pressure chambers and operable under the oil pressure in said auxiliary output oil pressure chamber exceeding a predetermined level to close fluid communication between said auxiliary input and output oil pressure chambers or to reduce the level of oil pressure being transmitted from said auxiliary input oil pressure chamber to said auxiliary output oil pressure chamber, and a tubular positioning pin fitted in said second communication hole and said duct passage at the juncture therebetween to hold said partition plate against rotation while placing said second communication hole and said duct passage in fluid communication with each other.

2. A brake oil pressure controlling valve device for vehicle use, comprising a valve casing formed therein with an input port communicating with a brake master cylinder and an output port communicating with rear wheel brakes, a partition plate fitted in said valve casing to define in an interior thereof, a damping chamber communicating with said input port and a valve chamber communicating with said output port by way of a valve port, said partition plate being formed therein with a first communication hole to place the damping and valve chambers in fluid communication with each other, a weighted valve element arranged in said valve casing being movable to close said valve port in response to the vehicle deceleration exceeding a predetermined value, a pair of smaller-diameter and larger-diameter cylinder bores formed in a side wall portion of said valve casing in substantially axially aligned relation to each other, a pair of smaller-diameter and larger-diameter pistons endwise held against each other and slidably fitted respectively in said smaller-diameter and larger-diameter cylinder bores to define in said smaller-diameter cylinder bore, a main input oil pressure chamber communicating with said input port and in said larger-diameter cylinder bore, a main output oil pressure chamber communicating with said output port, spring means arranged on said larger-diameter piston to bias the latter axially in the direction of said main output oil pressure chamber under a definite spring bias, an auxiliary input oil pressure chamber formed in said valve casing and communicating with said damping chamber by way of a second communication hole formed in said partition plate and a duct passage formed in the adjacent wall of said valve casing, an auxiliary output oil pressure chamber formed in said valve casing in fluid communication with said main output oil pressure chamber, and an auxiliary control valve arranged between said auxiliary input and output oil pressure chambers being operable under the oil pressure in said auxiliary output oil pressure chamber, exceeding a predetermined level to close fluid communication between said auxiliary input and output oil pressure chambers or to reduce the level of oil pressure being transmitted from said auxiliary input oil pressure chamber to said auxiliary output oil pressure chamber.

* * * * *